United States Patent
McCabe

(10) Patent No.: US 9,646,023 B1
(45) Date of Patent: May 9, 2017

(54) DEVICES AND METHODS CONFIGURED FOR AUTOMATED DUPLICATION OF NETWORK SHARED FOLDERS

(71) Applicant: Western Digital Technologies, Inc., Irvine, CA (US)

(72) Inventor: Timothy J. McCabe, Mission Viejo, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 341 days.

(21) Appl. No.: 13/802,281

(22) Filed: Mar. 13, 2013

(51) Int. Cl.
*G06F 17/30* (2006.01)

(52) U.S. Cl.
CPC .............................. *G06F 17/30215* (2013.01)

(58) Field of Classification Search
CPC ............. G06F 11/1456; G06F 11/1464; G06F 11/2056; G06F 3/067; G06F 3/0653; H04L 67/1097
See application file for complete search history.

(56) References Cited

U.S. PATENT DOCUMENTS

| 8,078,688 | B2 | 12/2011 | Ansari et al. | |
|---|---|---|---|---|
| 8,458,295 | B1* | 6/2013 | Crowell et al. | 709/219 |
| 2003/0145086 | A1* | 7/2003 | O'Reilly | 709/226 |
| 2004/0073747 | A1* | 4/2004 | Lu | G06F 3/0605 711/114 |
| 2005/0149480 | A1 | 7/2005 | Deshpande | |
| 2005/0149508 | A1 | 7/2005 | Deshpande | |
| 2006/0168000 | A1 | 7/2006 | Bodlaender | |
| 2007/0067263 | A1* | 3/2007 | Husain et al. | 707/2 |
| 2007/0192551 | A1* | 8/2007 | Hara | G06F 17/30197 711/162 |
| 2009/0210461 | A1* | 8/2009 | McChord | 707/204 |
| 2009/0327900 | A1 | 12/2009 | Noll et al. | |
| 2010/0241711 | A1 | 9/2010 | Ansari et al. | |
| 2012/0203742 | A1* | 8/2012 | Goodman et al. | 707/646 |
| 2013/0179398 | A1* | 7/2013 | Liao | G06F 17/30174 707/610 |
| 2014/0040580 | A1* | 2/2014 | Kripalani | 711/162 |

FOREIGN PATENT DOCUMENTS

JP      2007286939 A  * 11/2007

OTHER PUBLICATIONS

Dhumbumroong, Smith, and Krerk Piromsopa. "Personal Cloud Filesystem: A distributed unification filesystem for personal computer and portable device." In Computer Science and Software Engineering (JCSSE), 2011 Eighth International Joint Conference on, pp. 58-62. IEEE, 2011.*

(Continued)

*Primary Examiner* — Jason Liao

(57) ABSTRACT

A network attached storage may comprise one or more storage devices; a network interface configured to couple to a local area network; a share folder and a processor. The processor may be configured to auto-initiate an identification of at least one other similarly-configured network attached storage coupled to the local area network; monitor contents of the share folder to determine a presence of or a change to at least one item therein, and upon determining at least one of the presence of and the change to the at least one item in the monitored share folder, copying the item(s) to the identified network attached storage(s) over the local area network.

26 Claims, 5 Drawing Sheets

(56) References Cited

OTHER PUBLICATIONS

Malkin et al., RIPng for IPv6 Jan. 1997, Network Working Group, RFC 2080, https://tools.ietf.org/html/rfc2080.*
Shin et al., Application Aspects of IPv6 Transition Mar. 2005, Network Working Group, RFC 4038, https://www.ietf.org/rfc/rfc4038.txt.*

* cited by examiner

DEVICES AND METHODS CONFIGURED FOR AUTOMATED DUPLICATION OF NETWORK SHARED FOLDERS

BACKGROUND

Our daily lives are increasingly chronicled in digital form. The proliferation and increasing size of personal and financial files, digital images, audio and video leads users to spend an inordinate amount of time storing, managing, safeguarding and moving files and directories not only on internal storage within their personal computer, but also on external storage devices. The external storage device, however, may constitute a single source of failure, and the user's valuable data is susceptible to loss should the external storage device fail.

DETAILED DESCRIPTION

Figure 1:
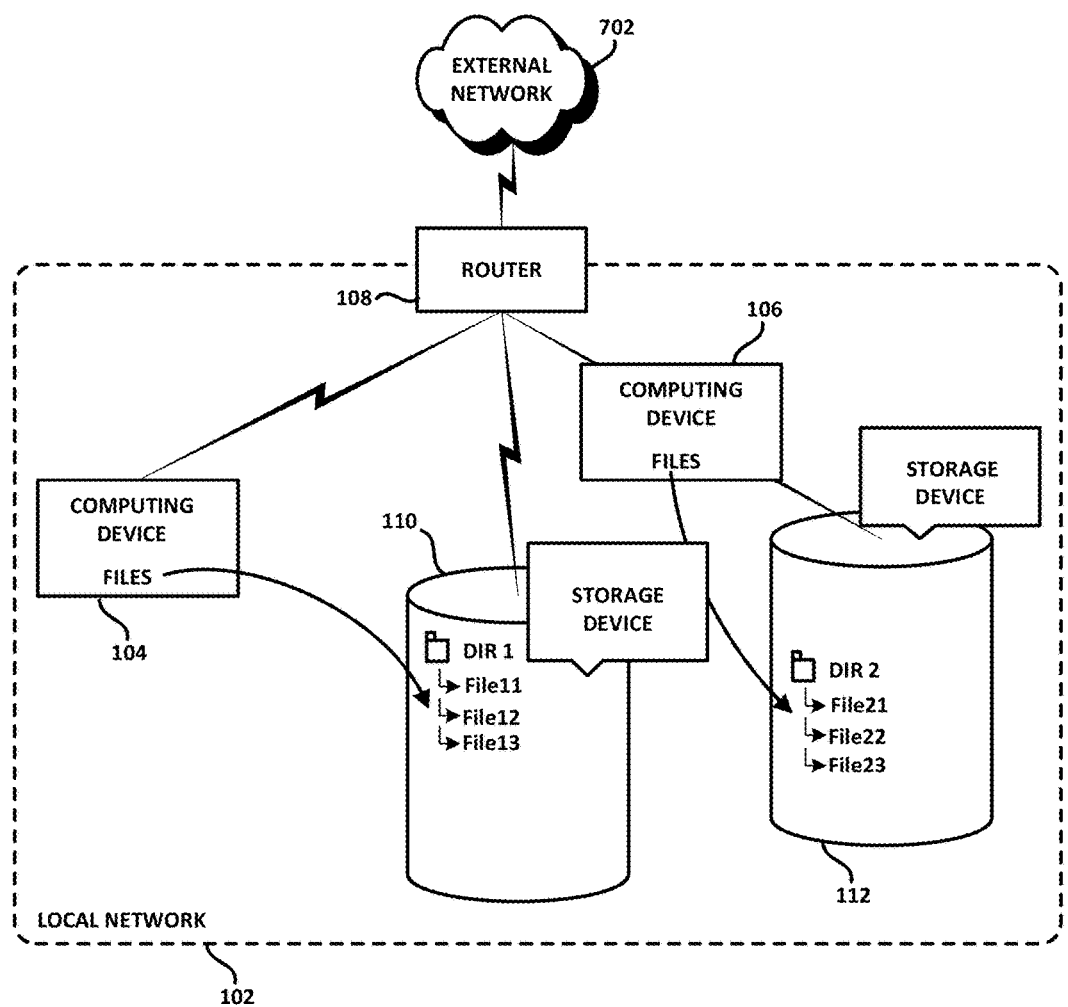
FIG. 1 is a block diagram of a local network comprising conventional storage devices coupled thereto.

FIG. 1 is a block diagram of a local network comprising conventional storage devices coupled thereto. As shown therein, a local network 102 may comprise computing devices 104, 106 that are coupled to an external network 702 (such as the Internet, for example) through a router 108. External storage device 110 may be coupled to computing device 104 directly or may be a network attached storage (NAS) coupled to the router 108. Similarly, external storage device 112 may be coupled to computing device 106 directly or may also be a NAS coupled to the router 108.

As illustrated in FIG. 1, external storage device 110 stores files 11, 12 and 13 in directory DIR 1. Similarly, external storage device 112 stores files 21, 22 and 23 in directory DIR 2. Conventionally, to safeguard files 11, 12 and 13 on external storage device 110, the user would have to manually copy these files, create a directory on external storage device 112 and move the copied files 11, 12 and 13 therein. The files may also be moved to an existing directory on external storage device 112. Similarly, to safeguard files 21, 22 and 23, the user would have to manually copy these files, create a directory on external storage device 110 and move the copied files 21, 22 and 23 therein. The files may also be moved to an existing directory on external storage device 110. However, such directories and files may change over time, sometimes frequently, thereby forcing the user to repeat the procedure frequently to physically complete the transfer and to maintain at least one duplicate copy of his or her files on another external storage device. Unfortunately, while such manual copying of files and directories avoids the single point of failure problem, such a procedure is not only tedious, but likely to be implemented only sporadically by the user.

Figure 2:
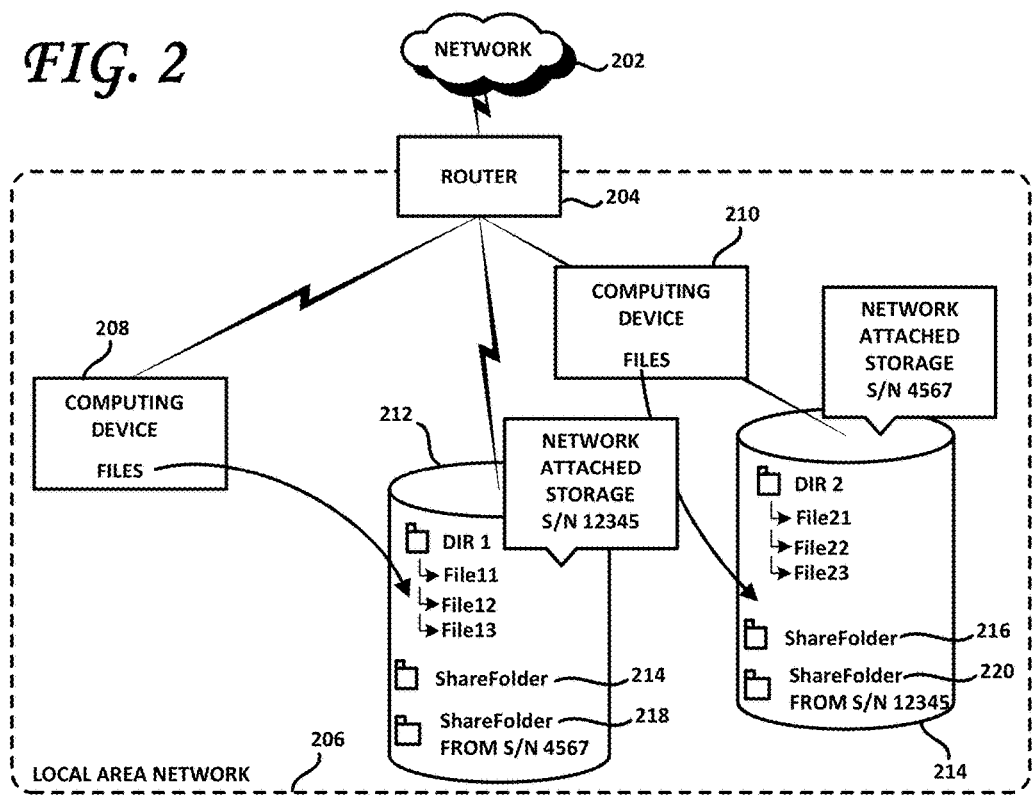
FIG. 2 is a block diagram of a local area network comprising network attached storage according to one embodiment.

FIG. 2 is a block diagram of a local area network comprising network attached storage, according to one embodiment. In the exemplary environment shown in FIG. 2, computing devices 208, 210 may be coupled to a router 204 within a local area network (LAN) 206. First and second NAS 212, 214 may also be coupled to the router 204 and may be available for data storage to the computing devices 208, 210. Within the present context, it is to be understood that the terms "network attached storage" and "NAS" may comprise, within their scope, any device coupled to a LAN that is configured and available for data storage. As shown in the example of FIG. 2, the file system of NAS 212 may comprise directory "DIR 1", comprising files 11, 12 and 13, which originated from computing device 208. Likewise, the file system of NAS 214 may comprise directory "DIR 2", comprising files 21, 22 and 23, which originated from computing device 210. According to one embodiment, each of the NAS 212, 214 may comprise one or more storage devices (e.g., hard disk drives, solid state drives or hybrids thereof) and a network interface that is configured to couple to the LAN 206.

As shown, NAS 212, according to one embodiment, may comprise a share folder 214. The share folder 214 may be configured, according to one embodiment, such that when a file, directory or link is placed therein, the NAS 212 auto-initiates (e.g., on its own initiate, without user prompting or interaction) a copy of at least some of the contents of the share folder to another NAS on the LAN. The share folder 214 may, according to one embodiment, be manufacturer pre-configured, which facilitates new NAS setup by the user, since the NAS can then auto-initiate copying of files in this pre-configured share folder 214 without additional user intervention. According to one embodiment, a NAS, such as NAS 212 in FIG. 1, may be configured to, upon its network interface coupling with the LAN 206, identify one or more similarly-configured NAS coupled to the LAN. In this case, the NAS 212 may, upon being coupled to the LAN 206, identify similarly-configured NAS 214. Herein, the phrase 'similarly-configured NAS' refers to a NAS or other storage device that is configured according to at least some of the structures and functionalities shown and described herein. According to one embodiment, the NAS 212 may then monitor the contents of the share folder 214 to determine the presence of at least one (e.g., new) file, directory or link therein. According to one embodiment, upon determining the presence of one or more files, directories and/or links in the monitored share folder 214, the NAS 212 may copy the file(s), directory(ies) and/or link(s) (hereafter, collectively, "item(s)") in the share folder 214 to the identified similarly-configured NAS(s) over the LAN 206. This may be carried out programmatically, without user interaction, and without the NAS 212 being directed to copy the item(s) to the NAS 214 by any computing device, such as computing devices 208 or 210 in FIG. 2. Indeed, this functionality may be carried out by one or more background processes executed within the NAS 212 and/or within the NAS 214.

As shown in FIG. 2, the NAS 212 may be configured to create (or cause NAS 214 to create), if not already present, a destination folder 220 on the NAS 214. This destination folder 220, in the example being developed in FIG. 2, is labeled as ShareFolder from S/N 12345. Indeed, each NAS, according to one embodiment, may be uniquely identified (by a serial number and/or a media access control (MAC) address, for example) on the LAN 206. Thus, in this example, NAS 212 is identified as NAS S/N 12345 and NAS 214 is identified as NAS S/N 4567. Other identifiers may be used. The destination folder 220 in NAS 214, therefore, may be created to receive the item(s) placed within the share folder 214 of the NAS 212. Subdirectories may be created within the destination folder 220 as necessary to store directories placed in the share folder 214 within NAS 212. A graphical user interface (GUI) may be used, for example, to enable the user to designate or drag and drop, for example, item(s) into the share folder 214.

As shown in FIG. 2, NAS 212 may also comprise a destination folder 218 configured to accept item(s) originating from a share folder 216 of NAS 214. This destination folder is shown in FIG. 2 as ShareFolder from S/N 4567, the unique identifier of NAS 214. In this manner, whenever item(s) are placed (either by a user or programmatically) within share folder 216 within NAS 214, such item(s) may be copied, without (any or further) user interaction or involvement, into the destination folder 218 of NAS 212 (and into respective destination folders of other identified similarly-configured NASs, if present).

According to one embodiment, a first background process may execute on NAS 212. A similar background process may execute on NAS 214. These first background processes (e.g., daemons), may be configured to monitor the contents of the respective share folders 214, 216 and to copy at least some of the item(s) present therein to one or more destination folders 218, 220 and to the destination folders of other identified similarly-configured NASs coupled to the LAN 206, is such NASs are present. Such background processes may do so without user prompting, interaction or involvement. The monitoring of the share folder may be carried out periodically, at an interval determined programmatically or as determined by a user, through a suitable user interface. The frequency of monitoring need not be high, as once every five to ten minutes may prove to be ample. Other intervals may be implemented. Alternatively, according to one embodiment, the monitoring may be event-driven. According to one embodiment, a second background process may execute on NAS 212 and a similar second background process may execute on NAS 214. These second background processes may be configured to identify all similarly-configured NAS(s) on the LAN 206. For example, one or more of the second background processes may broadcast a query over the LAN 206. Those similarly-configured NAS(s) on the LAN 206 responding to the broadcast query may then be the identified NAS(s) to which item(s) present in share folder(s) may be copied. Querying and responding NASs may then exchange sufficient information to enable the transfer and storage of copied items such as capacity information, identifiers, addresses and file system information, for example. Destination folders may be created at this time. According to one embodiment, the first and second background processes may be combined into a single background process or more than two background processes may carry out the functionality shown and described herein.

According to one embodiment, NASs 212, 214 may be configured to discriminate between newly-added item(s) placed in a share folder and item(s) that were previously copied to the identified NASs. Therefore, NAS 212, 214 may be configured to copy only newly-added or otherwise changed item(s) to the respective destination folders of the identified NASs. This prevents item(s) from being redundantly copied and reduces traffic on the LAN 206.

Figure 3:
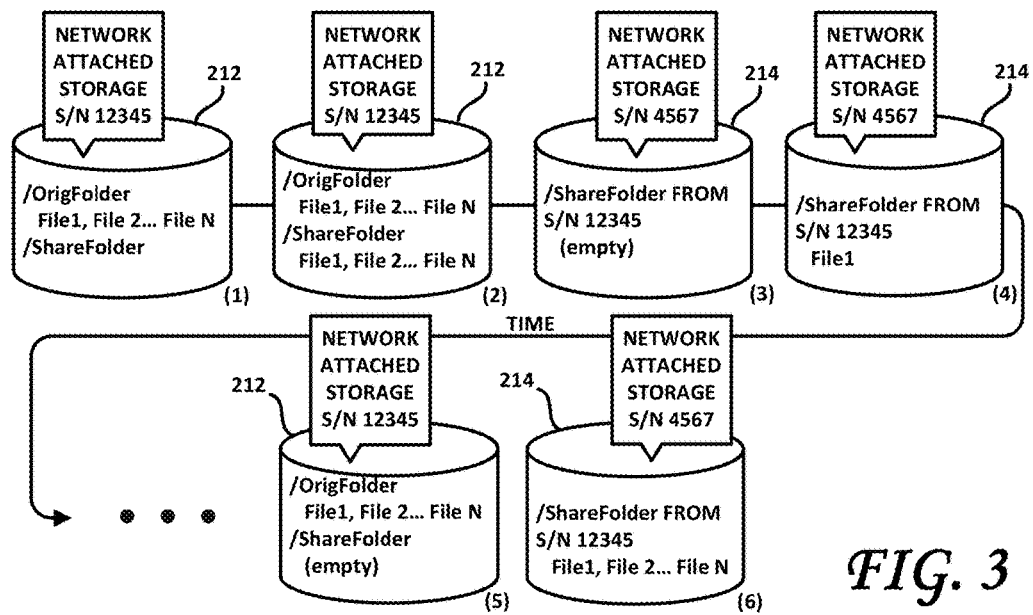
FIG. 3 is a timeline illustrating aspects of a method according to one embodiment.

FIG. 3 is a timeline of a method according to one embodiment. As shown therein, NAS 212, Serial Number 12345, may store a number of files (File1, File2, . . . , File N) in a directory (OrigFolder), as shown at (1). The user may wish these files to be replicated to one or more other NASs on the LAN, such as to NAS 214. To do so, according to one embodiment, the user may, through a GUI (for example), drop these files into the share folder of NAS 212, as shown at (2). In FIG. 3, it is assumed that NAS 212 has already identified NAS 214, serial number 4567 as another similarly-configured NAS coupled to the LAN 206. NAS 212 may then monitor the contents of its share folder(s) to determine a presence of item(s) or the presence of one or more changed items therein. Finding items File1, File 2, . . . , File N in its share folder, NAS 212 may begin copying File1, File 2, . . . , File N from its share folder to its destination folder in NAS 214. The destination folder of NAS 214, shown in FIG. 3 as "ShareFolder From S/N 12345", may be initially empty, as shown at (3). Alternatively, other item(s) may already be present therein. The destination folder in NAS 214 may have been created at the time at which NAS 212 initiated the copying of item(s) from its share folder or may have been created at the time NAS 212 identified NAS 214 as a similarly-configured NAS on the LAN 206. As shown at (4), NAS 212 may then begin sending the item(s) in its share folder(s) to its destination folder within NAS 214, which may then receive the sent item(s) and store them in its destination folder for NAS 212. At (4), NAS 214 has received the first item; namely, File 1. At (5), the share folder of NAS 212 may be emptied of recently copied item(s), as shown. Alternatively, the item(s) placed in the share folder of NAS 212 may simply stay there. As shown at (6), the destination folder of NAS 214 has received all items placed in the share folder of NAS 212; namely, File1, File2, . . . , File N. In this manner, any new item(s) or any changed item(s) placed or present in a share folder of a NAS coupled to the LAN 206 may be duplicated, without user direction or interaction, in one or more destination folders of one or more similarly-configured NASs that may also be coupled to the LAN 206. According to one embodiment, each NAS coupled to the local area network may comprise one or more destination folders and a share folder. That is, each NAS coupled to the LAN may be both an item(s) originating NAS and a receiving or destination NAS, thereby enabling efficient and unattended duplication of item(s) over the LAN 206.

Figure 4:
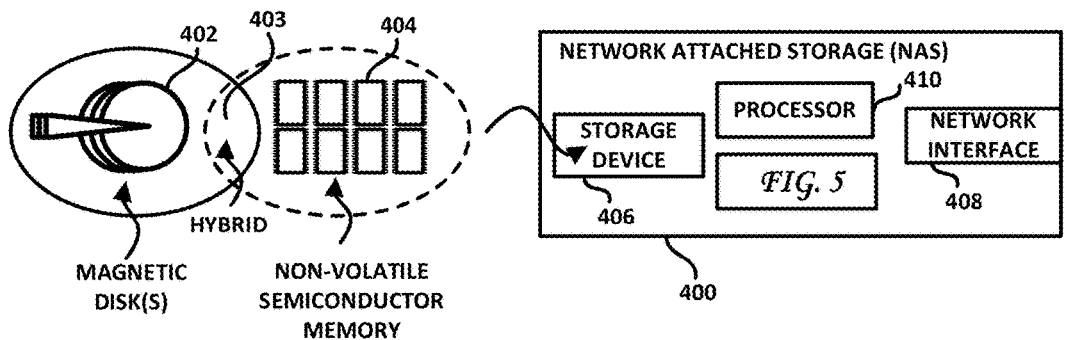
FIG. 4 is a block diagram illustrating aspects of a network attached storage according to one embodiment.

FIG. 4 is a block diagram of a NAS according to one embodiment. As noted above, a network attached storage or NAS, within the present context, may comprise any device that is configured to store data and that is configured to couple to a LAN. Such NAS 400, according to one embodiment, may comprise a storage device 406 that may be configured to store data on one or more rotating magnetic disks 402, on one or more non-volatile semiconductor memory devices 404 or on both magnetic disk(s) 402 and non-volatile semiconductor memory devices 404, as suggested at reference numeral 403. The NAS 400 may also comprise a network interface 408 such as, for example, a Universal Serial Bus (USB) interface, an Ethernet interface, Firewire interface and/or some other wired or wireless network interface. The NAS 400, as shown in FIG. 4, may also comprise a processor 410 configured to read from and write to the storage device 406 and to execute a method comprising a sequence of functional blocks, instructions or steps, such as described herein and as shown in FIG. 5.

Figure 5:
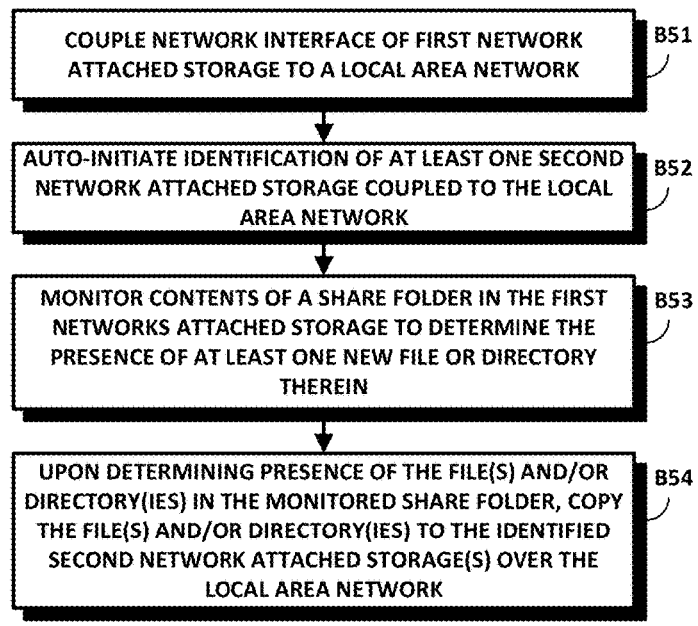
FIG. 5 is a flowchart of a method according to one embodiment.

FIG. 5 is a flowchart of a method according to one embodiment. As shown therein, block B51 calls for a first NAS to couple, via its network interface, to a LAN, such as shown at 206 in FIG. 2, for example. Block B52 calls for the first NAS to identify one or more second NASs coupled to the local area network. Such second NAS should be similarly-configured as is the first NAS. That is, the identified second NAS may be configured so as to have the same or a similar functionality as does the first NAS. For example, the identified second NAS may, according to one embodiment, be configured to be identifiable as a similarly-configured NAS by the first NAS and be configured to receive item(s) sent to it by the first NAS in a designated destination folder. As shown at B53, the first NAS may then monitor the contents of its share folder and to determine the presence of or changes to one or more item(s) therein. Thereafter, as shown at B54 in FIG. 5, when the first NAS determined the presence of (e.g., new or changed) item(s) in the monitored share folder, these item(s) may then be copied to the destination folder of the identified NAS over the LAN. According to one embodiment, at least some of such functionality may be (e.g., periodically) carried out by one or more background processes (e.g., daemons) on the first and second NAS, without user intervention or direction.

Figure 6:
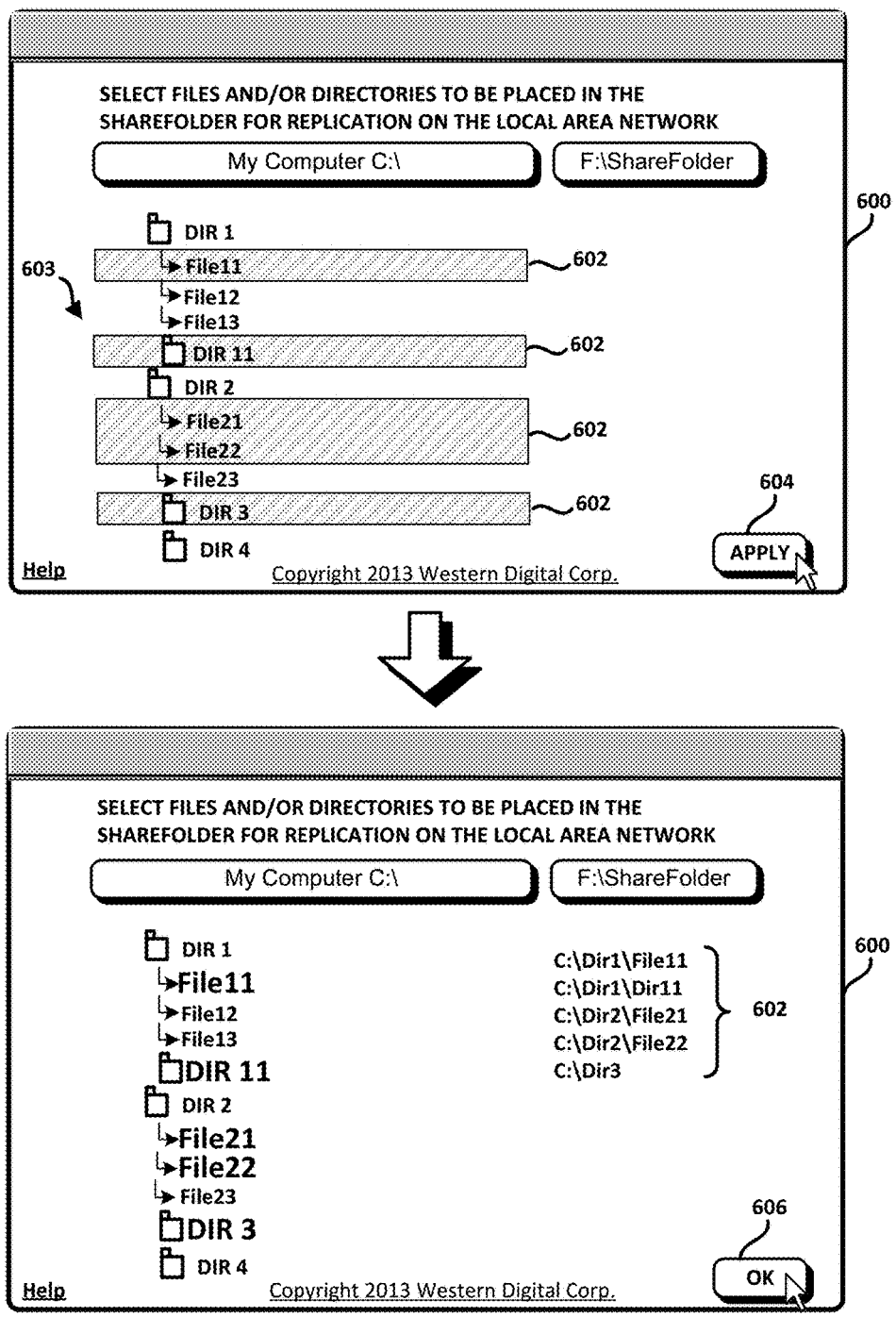
FIG. 6 shows aspects of an exemplary user interface, according to one embodiment.

FIG. 6 shows aspects of an exemplary user interface 600, according to one embodiment. The user interface 600 may comprise, as shown in FIG. 6, some graphical representation 603 of the file directory structure of a computing device. Moreover, the user interface 600 may enable a user to select one or more item(s) for duplication on an identified similarly-configured NAS coupled to the LAN. In FIG. 6, the user has been enabled to highlight, as shown at 602, a plurality of files and directories to be placed in the share folder. By clicking or otherwise selecting the "Apply" button 604, as shown in the upper diagram of FIG. 6, the selected items 602 may be placed in the NAS's share folder, as shown in the lower diagram of FIG. 6. Other selection mechanisms and graphical devices may be employed to place item(s) in or designate items for a share folder. For example, one or more items may be dragged and dropped into the share folder. Thereafter, as the NAS monitors the share folder and determines that new or changed items have been placed therein, such new or changed items may be copied into one or more destination folders of one or more other NASs coupled to the LAN.

Figure 7:
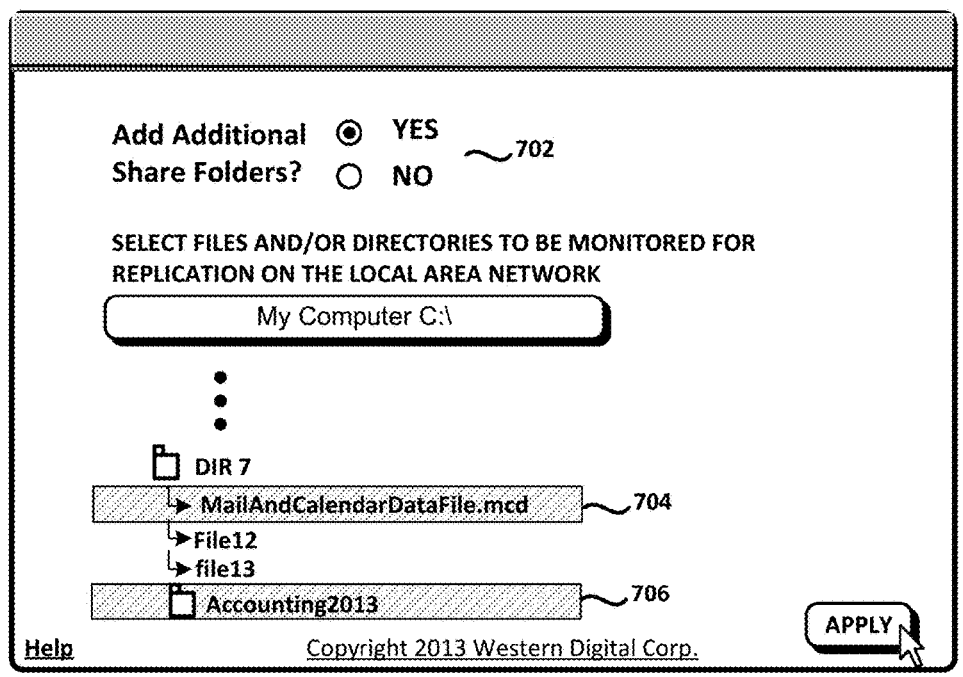
FIG. 7 shows further aspects of an exemplary user interface, according to one embodiment.

FIG. 7 shows further aspects of an exemplary user interface, according to one embodiment. According to one embodiment, each NAS may comprise one, two or a greater number of share folders. As shown at FIG. 7, the user may be presented with the opportunity to designate additional share folders, as shown at 702. This additional share folder or folders may be share folders newly-created for this purpose or may be existing folders. Such folders designated as additional share folders may then be monitored for new or changed items and the contents thereof selectively copied to one or more destination folders in one or more similarly-configured NASs as new items are placed in such designated additional share folder or as items therein are changed. In the example developed in FIG. 7, the Accounting2013 directory is designated, as shown at 706, as an additional share folder. According to one embodiment, by designating a single file within a specified directory (such as file MailAndCalendarDataFile.mcd 704 in FIG. 7), only the designated file may be copied to one or more destination folders on one or more NASs coupled to the local area network. This single file, instead of a share folder, may then be monitored. When such designated and monitored file changes, as evidenced by a changed "last modified" date, a changed checksum, a changed size or some other changed parameter, the file may be copied to one or more destination folders on one or more similarly-configured NASs coupled to the LAN, without further user-direction or interaction.

Accordingly, valuable files may be safeguarded from the failure of a single data storage device on the local area network in a manner that is reliable and transparent to the user. Moreover, such duplicated files remain within the user's control and are not sent to some remote storage facility over the Internet. While certain embodiments of the disclosure have been described, these embodiments have been presented by way of example only, and are not intended to limit the scope of the disclosure. Indeed, the novel methods, devices and systems described herein may be embodied in a variety of other forms. Furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure. For example, those skilled in the art will appreciate that in various embodiments, the actual physical and logical structures may differ from those shown in the figures. Depending on the embodiment, certain steps described in the example above may be removed, others may be added. Also, the features and attributes of the specific embodiments disclosed above may be combined in different ways to form additional embodiments, all of which fall within the scope of the present disclosure. Although the present disclosure provides certain preferred embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

The invention claimed is:

1. A network attached storage, comprising:
at least one storage device;
a network interface configured to couple to a local area network;
a share folder stored in the at least one storage device; and
a hardware processor coupled to the at least one storage device and the network interface, the hardware processor being configured to execute instructions to, upon the network interface being coupled to the local area network:
auto-initiate an identification of other similarly-configured network attached storages coupled to the local area network, the identification comprising:
broadcasting a query over the local area network; and
receiving responses to the broadcasted query from identified first and second similarly-configured network attached storages coupled to the local area network;
monitor contents of the share folder to determine a presence of or a change to at least one first item therein;
upon determining at least one of the presence of and the change to the at least one first item in the monitored share folder, copy the at least one first item to a first destination folder in the identified first similarly-configured network attached storage and copy the at least one first item to a second destination folder in the identified second similarly-configured network attached storage over the local area network, the first and second destination folders being configured to identify, and store items originating from, the network attached storage from which the at least one first item is copied;
receive, over the local area network, second and third items from the identified first and second similarly-configured network attached storages, respectively;

create, in the at least one storage device, a third destination folder configured to store items received from the identified first similarly-configured network attached storage and a fourth destination folder configured to store items received from the identified second similarly-configured network attached storage, the first to fourth destination folders being different from one another; and store the received second item in the third destination folder and store the received third item in the fourth destination folder.

2. The network attached storage of claim 1, wherein the processor is further configured to execute a first background process, the first background process being configured to at least monitor the contents of the share folder and copy the at least one first item to the first destination folder in the identified first similarly-configured network attached storage without user interaction.

3. The network attached storage of claim 2, wherein the processor is further configured to execute a second background process, the second background process being configured to identify the similarly-configured network attached storages without user interaction.

4. The network attached storage of claim 3, wherein broadcasting the query over the local area network and receiving the responses to the broadcasted query are performed by the second background process.

5. The network attached storage of claim 1, wherein the processor is further configured to respond to a query from the identified similarly-configured network attached storages.

6. The network attached storage of claim 1, wherein the processor is further configured to create the first destination folder in the identified first similarly-configured network attached storage.

7. The network attached storage of claim 1, wherein the processor is further configured to:
discriminate between newly-added items in the share folder and items that were previously copied to the identified similarly-configured network attached storages; and
copy only the newly-added or changed items to the first and second destination folders in the identified first and second similarly-configured network attached storages, respectively.

8. The network attached storage of claim 1, wherein the processor is further configured to enable the identified first similarly-configured network attached storage to create the third destination folder in the at least one storage device.

9. The network attached storage of claim 1, wherein the processor is further configured to generate a user interface configured to enable user placement of the at least one first item into the share folder to be copied to the first destination folder in the identified first similarly-configured network attached storage over the local area network.

10. The network attached storage of claim 9, wherein the user interface is further configured to enable an identification of additional items to be monitored and copied to the identified first similarly-configured network attached storage over the local area network upon the processor detecting a change thereto.

11. The network attached storage of claim 1, wherein the share folder is manufacturer-pre-configured.

12. The network attached storage of claim 1, wherein the processor is further configured to perform the auto-initiation of the identification of the similarly-configured network attached storages programmatically, without user intervention.

13. The network attached storage of claim 1, wherein the at least one first item comprises at least one of a file, a directory, and a link.

14. A method, comprising:
coupling a network interface of a first network attached storage to a local area network; and
upon the network interface of the first network attached storage being coupled to the local area network:
auto-initiating an identification of other similarly-configured network attached storages coupled to the local area network, the identification comprising:
broadcasting a query over the local area network; and
receiving responses to the broadcasted query from the identified similarly-configured network attached storages coupled to the local area network;
monitoring contents of a share folder in the first network attached storage to determine a presence of or a change to at least one first item therein;
upon determining at least one of the presence of and the change to the at least one first item in the monitored share folder, copying the at least one first item to a first destination folder in a first identified similarly-configured network attached storage and copying the at least one first item to a second destination folder in a second identified similarly-configured network attached storage over the local area network, the first and second destination folders being configured to identify, and store items originating from, the first network attached storage from which the at least one first item is copied;
receiving, over the local area network, second and third items from the first and the second identified similarly-configured network attached storages, respectively; and
storing the received second item in the first network attached storage in a third destination folder configured to store items received from the first identified similarly-configured network attached storage and storing the received third item in the first network attached storage in a fourth destination folder configured to store items received from the second identified similarly-configured network attached storage, the first to fourth destination folders being different from one another.

15. The method of claim 14, wherein at least the monitoring and the copying are configured to be performed by a first background process without user interaction.

16. The method of claim 15, wherein at least the auto-initiating of the identification of the first and second identified similarly-configured network attached storages coupled to the local area network is performed by a second background process without user interaction.

17. The method of claim 16, wherein broadcasting the query over the local area network and receiving the responses to the broadcasted query is performed by the second background process.

18. The method of claim 14, further comprising responding to a query from the first and second identified similarly-configured network attached storages.

19. The method of claim 14, further comprising creating the first destination folder in the first identified similarly-configured network attached storage and creating the second destination folder in the second identified similarly-configured network attached storage.

20. The method of claim 14, further comprising:
discriminating between newly-added items in the share folder and items that were previously copied to the identified similarly-configured network attached storages; and
copying only the newly-added or changed items to the first and second destination folders in the first and second identified similarly-configured network attached storages, respectively.

21. The method of claim 14, further comprising the second identified similarly-configured network attached storage creating the fourth destination folder in the first network attached storage.

22. The method of claim 14, further comprising generating a user interface configured to enable user placement of the at least one first item into the share folder to be copied to the first destination folder in the first identified similarly-configured network attached storage over the local area network.

23. The method of claim 22, wherein the user interface is further configured to enable an identification of additional items to be monitored and copied to the first identified similarly-configured network attached storage over the local area network upon detecting a change thereto.

24. The method of claim 14, wherein the share folder is manufacturer-pre-configured.

25. The method of claim 14, wherein the auto-initiating of the identification of the similarly-configured network attached storages is performed programmatically, without user intervention.

26. The method of claim 14, wherein the at least one first item comprises at least one of a file, a directory, and a link.

\* \* \* \* \*